March 24, 1970      W. L. GARDNER      3,502,455
METHOD OF FABRICATING A THIN FILM VITREOUS CONTINUOUS
MEMBRANE PRODUCT
Filed Oct. 9, 1967

*INVENTOR*
WILLIAM L. GARDNER

BY *Stowell and Stowell*

*ATTORNEYS.*

United States Patent Office 3,502,455
Patented Mar. 24, 1970

3,502,455
METHOD OF FABRICATING A THIN FILM VITREOUS CONTINUOUS MEMBRANE PRODUCT
William L. Gardner, Wellesley, Mass., assignor to The Bendix Corporation, Detroit, Mich., a corporation of Delaware
Filed Oct. 9, 1967, Ser. No. 673,571
Int. Cl. C03b 15/00
U.S. Cl. 65—31   11 Claims

ABSTRACT OF THE DISCLOSURE

A method of fabricating thin film membranes. The surface of a substrate, having an etch resistant core casing or an etch resistant matrix encasing etchable core or cores forming a flat surface, is coated with an etch resistant vitreous continuous thin film and the core or cores are subsequently entirely removed by etching to produce a free standing, edge supported vitreous continuous membrane in the range of 15 to 100 microns composed of the thin film supported by the core casing or matrix.

BACKGROUND OF THE INVENTION

This invention relates generally to methods of forming thin membranes and more specifically to a novel method capable of producing extremely thin, self-supported membrane structures in the range of ten microns to ten millimicrons in thickness.

Thin films or membranes find many uses in technology, such, for example, as vibrating diaphragms for audio pickups or transmitters, pressure sensing or measuring diaphragms, deflectable light reflecting or deflecting surfaces, selectively permeable membranes for gaseous, hydraulic or biological fluids and the like.

Since both sensitivity and control or permeability are a function of membrane thickness and material, it is highly desirable to provide diaphragms having the greatest possible range of thickness and material characteristics. Since pressure sensitivity is inversely proportional to membrane thickness, it is particularly important to provide diaphragms as thin as possible in applications where high sensitivity to pressure is required. Since permeability, reflectivity and like characteristics are a function of membrane material, it is important to provide a method for fabricating membranes for a wide range of materials.

In prior art methods, the minimum thickness of films or diaphragms has been limited by the methods of producing such film. For example, thin polymer films coated with a reflective surface have found application for microphonic elements. Since such films are generally produced mechanically by means of extrusion or calendering of material into free standing webs or by spreading plastic material on water, such, for example, as an organic solution of a cellulose ester, and the reflective surface is subsequently coated thereon, the minimum thickness thereof has been limited by a requirement for mechanical strength sufficient to withstand handling during the subsequent processing thereof. In the film produced by the above methods, a membrane 200 millimicrons in thickness is considered near minimum. Furthermore, since the reflective surface must be conventionally coated on the plastic films, the range of materials available for either the membrane or the coating has been limited to conventional membrane materials.

SUMMARY OF THE INVENTION

This invention overcomes the prior art disadvantages by furnishing a novel method of fabricating thinner membranes than heretofore practicable. This is achieved by forming a thin membrane in situ on supporting structure. After formation of the membrane, a portion of the supporting structure is removed to provide free standing, edge supported thin diaphragm thereby eliminating the requirement for mechanical handling of the diaphragm material itself.

This invention furthermore provides a method of fabricating thin membranes from a wider range of materials than heretofore possible. This is achieved by furnishing a process wherein the membrane material is deposited as a coating on a solid substrate, and portions of the substrate are subsequently removed to provide free standing membranes in the area of substrate removal. With such a process, such materials as glass and ceramics may be transferred by techniques such as vacuum evaporation, sputtering or the like, to form the resultant membrane.

In a preferred embodiment, this invention further provides a method for fabricating a membrane having inherently smoother surface qualities than heretofore practicable. This is achieved by forming the membrane as a deposited coating on a polished glass substrate which substrate necessarily transfers its smoothness properties to the coating membrane in such a manner that the structure thereof will be molecularly affected by the nature of the polished surface on which it is formed.

This invention also provides a method for supported, thin membranes without imposing stress thereon during fabrication of support therefor by forming a composite support prior to formation of the membrane, forming the membrane on the composite support by direct coating thereof and removing a portion of the support by chemical means to yield free standing membranes at the portion of the support removed from the composite.

A preferred embodiment of the invention additionally provides means to strongly adhere a thin membrane to a supporting substrate by utilizing the strong adhesion characteristic inherent in coatings formed on a substrate by plasma sputtering in combination with the relatively gentle characteristics of core removal by the etching technique.

In a preferred embodiment, this is achieved by providing a mosaic substrate formed of selected glass constituents comprising a core or cores and a cladding or an interconnecting matrix. The glass constituent forming the core is selected to have etching properties different than the glass constituent forming the cladding or matrix. The membrane is formed by depositing a thin film of material on a flat surface of the mosaic by means such as plasma sputtering. The core or cores are subsequently removed from the cladding or matrix by selective etching thereof to yield a residual tube or matrix supporting a thin membrane or membranes comprising the coating film at points from which the core or cores are removed.

These objects and other advantages of the invention will become better understood by those skilled in the art by reference to the following detailed description in which like numerals throughout the figures thereof indicate like components and wherein:

DESCRIPTION OF THE PREFERRED EMBODIMENTS

Figure 1:
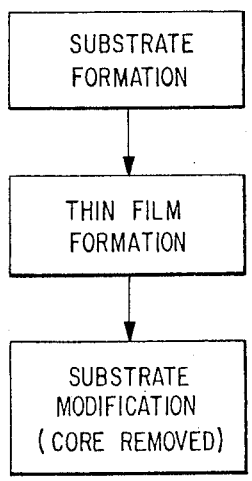
FIGURE 1 is a diagrammatic representation of steps in accordance with a method of the invention.

Referring now in particular to FIGURE 1, the steps in a method in accordance with the invention are shown in diagram form and comprise, as indicated:

(1) formation of a substrate;
(2) formation of a thin film on the substrate; and
(3) modification of the substrate to produce the final article.

Figure 2:
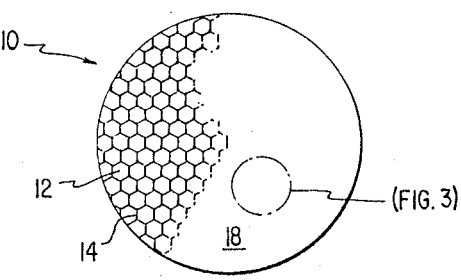
FIGURE 2 is a plan view schematically showing a mosaic substrate prepared in accordance with the invention.

Referring now more specifically to step 1 above and to FIGURE 2, the desired substrate comprises a mosaic, indicated generally at 10, composed of a plurality of parallel cores 12 embedded in a matrix 14, the composite being finished to form a surface 18.

Figure 3:
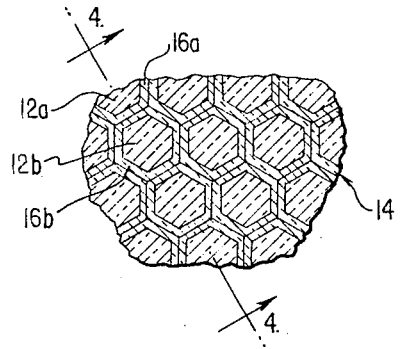
FIGURE 3 is an enlarged sectional view of a portion of the substrate of FIGURE 2 (in the plane of that figure), and partly broken away.

With particular reference to FIGURE 3, it is seen that cores 12a, 12b and so on are formed of hexagonal rods extending normal to the plane of the figure while the matrix in this figure indicated generally at 14, comprises adjacent walls of tubular glass cladding 16a, 16b of the respective cores 12a and 12b. The cladding 16 has been fused together under heat and pressure to form a solid substrate. The hexagonal configuration of the components is representative and the result of formation of such and a mosaic by fusing a bundle of cylindrical rods under heat and radial compression. As indicated in FIGURE 3, the matrix 14 is bisected by a mid line defining the original cladding, such as between 16a and 16b, however, it should be understood that the matrix, as shown in FIGURE 3, comprises a continuous integral fused glass structure and the bisecting lines are provided for descriptive purposes only. The mosaic may be formed by any of several means known in the art and particularly by such means known in the art of glass fiber optics. For example, a method disclosed in U.S. Patent No. 3,294,504 issued Dec. 27, 1966 to Hicks, has been found particularly suitable in preparation of the substrate 10. In that disclosure a highly etchable glass rod is clad with a glass tube having a lower rate of etching. Cladding is accomplished by progressively drawing the rod and tube through a heated zone to form a composite fiber which is then cut, stacked and, if smaller diameter fibers are desired, redrawn through heated zones to form a multiple fiber of the required fiber density. The redrawn multiple fiber is then cut into predetermined lengths, stacked upon one another, and the stacked multiple fibers are placed in, for example, a metal mold having a movable mold surface, heated to a fusing temperature and pressed into a composite assembly. The stacked and fused multiple fiber unit is then sliced transversely across the fibers into wafers. The resultant wafer produced by the above method then forms the substrate of this invention, with the fibers forming the cores 12 and the fused tubes forming the matrix 14. A surface of the substrate thus produced is polished, preferably through means known in the optics art, to a high surface finish as will be discussed in more detail below.

The glass constituents making up the cores 12 and the cladding 16 are selected from glasses having different etching properties so that portions of the substrate may be removed by selective etching thereof. For example, the fibers ultimately forming the cores 12 may comprise one of the lanthanum silicate glasses which are readily chemically etched with nitric acid. A suitable lanthanum silicate glass for this purpose may comprise (percentage by weight) $SiO_2$—12%; BaO—47%; $B_2O_3$—18%; $ThO_2$—10%; $LaO_3$—10%; iron and aluminum oxides—3%. A glass suitable for the cladding, not etched by nitric acid, may comprise $SiO_2$—80.6%; $B_2O_3$—13.0%; $Na_2O$—3.8%; $K_2O$—.4%; $Al_2O_3$—2.2%.

Although glass has been specifically referred to hereinabove as the material making up the constituents of the substrate, various other materials having different etching properties may be used, if so desired. It is essential for some uses, however, that the constituents have all the characteristics of polished glass, that is, an extremely smooth surface finish which is flat both in the microscopic and macroscopic sense. Optical flatness specifications such, for example, as fringe count, etc., may thereby be applied to the surface finish. Additionally, on a microscopic and submicroscopic scale, the surface smoothness with glass is of a much higher quality than would be possible with metal, plastic or other non-vitreous substances. It should also be understood that the term "glass," as used throughout the specification and claims, is intended in its generic sense to include all inorganic vitreous compositions.

After the fabrication of substrate 10 and preparation of the surface 18 as described above, the surface is coated with a film 20. Coating may be accomplished by any of several methods known in the art, such, for example, as by vacuum deposition of a material thereon by evaporation, by sputtering or by electron beam or ion beam bombardment. Additionally, chemical deposition methods with the application of gaseous or spin coating techniques are also suitable for such coating. Specifically a newly improved technique of sputtering which essentially comprises a method of transferring material from a flat target across a narrow gap to a substrate has been found to be particularly suitable as a method of forming the film 20. For example, by using a radio frequency plasma sputtering unit, it is possible to so transfer extremely glassy layers, such, for example, as chemical Pyrex glass, fused silica or any of a wide variety of optical glasses and ceramics. This latter process is particularly beneficial furthermore, since, even though the process proceeds at or close to room temperature and the material transfer is accomplished in quantities of extremely small mass (e.g., that which can be displaced by a single charged gaseous ion), it has been demonstrated that the layer built up across the gap has all of the necessary bulk material characteristics of solid fused glass or other ceramic surfaces. Through use of this process, layers can be built up gradually from an essentially monomolecular layer to other thicknesses which possess useful chemical, mechanical and electrical properties particularly when provided as free standing membranes rather than as limited surface coatings.

The material of the coating 20 should be selected in accordance with the use intended for the resultant article. For example, if the membrane is to be utilized in an ultrasensitive microphone or hydrophone incorporating, for example, laser interference techniques, the coating can comprise silica in any of its several forms (fused silica, crystal silica, etc.). For other applications, the membrane may comprise a glass such as soda lime glass of the following formulation:

| | Parts by wt. |
|---|---|
| $SiO_2$ | 71.5 |
| $AlO_2$ | 1.5 |
| $NaO_2$ | 14.0 |
| CaO | 13.0 |

It should be understood that, by utilizing the process taught by this invention, materials such as glass as described above, and other unusual substances, such as refractory metals, heretofore unavailable for thin film membranes, may be used, if their properties are particularly beneficial for specific uses.

Where it is intended that the device be used as a selectively permeable membrane for gaseous, hydraulic or biological fluids, the material can be selected in accordance with the specific fluid to which the membrane is to be permeable. For example, if it is desired to provide a membrane selectively permeable to helium gas, the coating material making up the film 20 can be a fused silica. On the other hand, if biological fluid filtration and small pore size is required (10 to 1,000 angstroms) to meet various filtration requirements, such a membrane can be provided by selecting suitable vitreous and ceramic materials and depositing them in layers. The resultant structures have a high throughput rate as well as high temperature bakeout and sterilization burnout capabilities.

Figure 4:
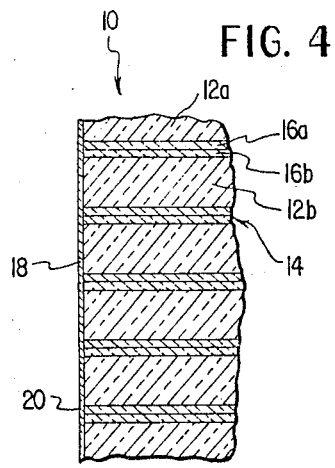
FIGURE 4 is a fragmentary sectional view of the substrate of FIGURE 3, taken along the lines 4—4 thereof, illustrating the substrate after coating thereof, in accordance with the invention.
Figure 5:
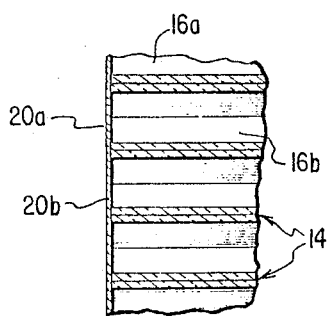
FIGURE 5 is a view similar to FIGURE 4 showing the final product produced by the inventive method.

By reference now to FIGURE 5, it is seen that the cores 12 (FIGURE 2 through FIGURE 4) have been removed. If, as in the example set forth above, a matrix, not etchable by nitric acid, encapsulates cores, etchable in nitric acid, the cores 12 can be removed by treating the substrate 10 with nitric acid thereby leaving a residual matrix 14 formed of adjacent walls of the cladding 16 to provide free edge supported membranes 20a, 20b and so forth. During the etching process, little or no mechanical force is imposed on the film 20 thereby making it possible to produce a thin membrane of a minimum thickness dictated solely by the properties of the coating material itself. As was indicated above, thicknesses down to 10 millimicrons can be achieved utilizing the steps of this inventive method. Obviously, many combinations of glass constituents and etching components, within limits of compatibility with the material forming the film 20, may be used as desired.

Structures fabricated in accordance with the invention can also be applied to new types of fiber optic face plates, for example, a face plate having a high transmission, ultraviolet capability. A face plate of this capability can be obtained by fabricating the substrate from a fused glass capillary array, as above, and providing a thin glass coating in the range of 15 to 100 microns to form the membrane. Phosphor is then applied to the capillary or supported side of each membrane and light, through a very large solid angle, is directed on this array by a detector disposed on the non-vacuum (unsupported) side of the thin membrane.

What is new and therefore desired to be protected by Letters Patent of the United States is:

1. A method of fabricating thin edge supported extended surface films and membranes comprising the steps of:
   forming a differentially etchable mosaic substrate comprising a matrix and at least one core member encased thereby with said matrix and one end of the core member forming a film support surface; and said core member having a greater etching rate than the matrix;
   depositing a thin film etch resistant continuous coating on said film support surface; and
   entirely removing, by etching, said core from said substrate to produce a free standing edge supported membrane comprising said coating supported by said matrix.

2. The method defined in claim 1 wherein said substrate comprises a fused glass capillary array with cores encased therein by an integral matrix.

3. The method defined in claim 2 wherein said capillary array is fabricated by forming a plurality of clad cores into parallel abutting relationship to one another to form a composite and unifying said composite by simultaneously applying heat and pressure thereto to fuse the cladding for formation of the integral matrix.

4. The method defined in claim 3 further comprising polishing said substrate to a smooth, optically flat surface finish before depositing said continuous coating thereon.

5. The method defined in claim 4 further comprising cutting said composite into transverse segments and thereafter polishing at least one transverse surface of each of said segments to a smooth, optically flat surface finish before depositing said continuous coating thereon.

6. A method of fabricating an edge support membrane comprising the steps of:
   forming a film supporting differentially etchable substrate comprising at least one core member and an encasing matrix;
   forming a continuous coating on said substrate by depositing an etch resistant membrane forming material thereon; and
   entirely removing by etching said core from said matrix to produce a free standing, edge supported membrane comprising said coating supported by said matrix.

7. The method defined in claim 6 wherein said deposit is accomplished by vacuum sputtering said material thereon.

8. The method defined in claim 7 wherein said vacuum sputtering is accomplished by bombarding said material with a plasma.

9. The method defined in claim 8 wherein said plasma is of radio frequency.

10. The method defined in claim 6 wherein said material is a vitreous substance.

11. A thin film membrane structure comprising a plurality of tubular supports each having an opening therethrough, with the openings in parallel alignment and with the outer surfaces of the tubular supports in intimate side by side relation, and a continuous vitreous thin film membrane in the range of 15 to 100 microns fused to one end of the supports and spanning each of the openings therein.

References Cited

UNITED STATES PATENTS

| | | | |
|---|---|---|---|
| 2,879,147 | 3/1959 | Baker | 65—31 |
| 3,275,428 | 9/1966 | Siegmund | 65—31 |
| 3,310,423 | 3/1967 | Ingham | 65—60 |
| 2,619,438 | 11/1952 | Varian et al. | 65—61 |
| 3,294,504 | 12/1966 | Hicks | 65—3 |
| 3,441,397 | 4/1969 | Sturgill | 65—33 |

S. LEON BASHORE, Primary Examiner

E. R. FREEDMAN, Assistant Examiner

U.S. Cl. X.R.

65—3, 4, 60, 61; 117—106, 124, 125; 161—68, 69